United States Patent [19]

Roberts et al.

[11] 3,998,909

[45] Dec. 21, 1976

[54] MOLDING COMPOUNDS

[75] Inventors: Michael G. Roberts, Heath; Charles E. Bolen, Newark, both of Ohio

[73] Assignee: Owens-Corning Fiberglas Corporation, Toledo, Ohio

[22] Filed: Sept. 3, 1974

[21] Appl. No.: 502,691

[52] U.S. Cl. .............................. 260/862; 260/40 R; 260/876 R; 260/876 B; 260/879; 260/880 R; 260/880 B

[51] Int. Cl.$^2$ .................... C08L 67/06; C08L 9/04; C08L 9/08

[58] Field of Search ........... 260/862, 880 R, 876 R, 260/894, 876 B

[56] References Cited

UNITED STATES PATENTS

| | | | |
|---|---|---|---|
| 3,217,066 | 11/1965 | Greenspan et al. | 260/862 |
| 3,577,480 | 5/1971 | Thorpe | 260/862 |
| 3,681,474 | 8/1972 | Lombardi et al. | 260/876 B |
| 3,733,370 | 5/1973 | Thompson et al. | 260/862 |
| 3,857,812 | 12/1974 | Nowak et al. | 260/862 |

*Primary Examiner*—Murray Tillman
*Assistant Examiner*—Thurman K. Page
*Attorney, Agent, or Firm*—John W. Overman; Philip R. Cloutier

[57] ABSTRACT

The surface characteristics, including shrink and gloss of molded thermosetting resin compounds, are improved by incorporating into the thermosetting resin a thermoplastic composition produced by the polymerization of a monomer with unsaturated elastomeric polymers.

28 Claims, No Drawings

MOLDING COMPOUNDS

This invention relates to improved molding compounds.

In one of its more specific aspects, this invention relates to the modification of thermosetting resins by the introduction thereinto of a thermoplastic composition formed by the polymerization of at least one monomer with at least two unsaturated polymeric elastomers.

Thermosetting resin prepolymers, which are frequently unsaturated polyesters which crosslink during curing to a thermoset condition, are well known. When thermosetting polyesters are employed in sheet and bulk molding compounds which are molded, the molded product usually evidences shrink and sink and possesses a dull surface.

In order to eliminate at least a portion of these difficulties, it is customary to incorporate into the thermosetting polyester resin at least one thermoplastic resin. The thermosetting and thermoplastic resins are mixed in the form of syrups and the combination of resin syrups are blended with fillers, crosslinking agents and gelling agents to form moldable compositions. These compositions upon molding form molded products containing the thermosetting polyester resin as the continuous phase with the thermoplastic resin dispersed therein.

The present invention provides a novel thermoplastic composition which is incorporated into the thermosetting polyester resin to reduce shrinkage and to improve the surface characteristics of the molded product.

According to this invention there is provided a moldable composition comprising a thermoplastic composition produced by polymerization of at least one monomer with first and second unsaturated elastomers, a moldable polyester, and a polymerizable reactive monomer.

Also, according to the present invention there is provided a method of producing a moldable compound which comprises incorporating into a thermosetting polyester resin matrix a thermoplastic composition comprising the unsaturated polymerization products of at least one monomer with first and second unsaturated elastomeric polymers, the thermoplastic composition being present in an amount sufficient to improve at least one property of the molded thermosetting resin.

The unsaturated polyesters, in themselves, are well known in the art as are the methods of preparing them. Such polyesters can be prepared by condensing an $\alpha\beta$-ethylenically unsaturated dicarboxylic acid or anhydride, or mixtures thereof, with a dihydric alcohol or mixtures of dihydric alcohols. In this respect, the term "dicarboxylic acid" is intended to include anhydrides of the corresponding acids. Examples of preferred unsaturated dicarboxylic acids are maleic or fumaric acids. Dihydric alcohols which are useful in preparing the polyesters include propylene glycol, dipropylene glycol, diethylene glycol, 1,3-butanediol, and the like, and their mixtures.

The unsaturated, thermosetting polyesters employable in this invention are produced under prior art conditions including a temperature within the range of from about 90° to about 400° F with the reaction being terminated by the use of materials such as toluhydroquinone, hydroquinone, methyl ether of hydroquinone, m-dinitrobenzene, and the like. The polymerization is terminated preferably at an acid number less than about 100, with an acid number of about 30 being particularly suitable.

The monomer employed in this invention is a liquid monomer or mixture of monomers having at least one ethylenically reactive

group per molecule. The monomeric liquid substance must be copolymerizable with the unsaturated polyester and develop therewith a crosslinked or thermoset structure. The monomer must act as a solvent for the unsaturated polyester and the thermoplastic polymer over a wide range of concentrations. Examples of suitable monomers are styrene, vinyl toluene, methyl methacrylate, butylmethacrylate and the like, and mixtures thereof.

The unsaturated thermoplastic compositions of this invention are produced using conventional polymerization techniques employing components such as are described hereinafter. Preferably, the polymerization temperature will be within the range of from about 100° to about 200° F, the reaction being initiated by initiators such as benzoyl peroxide, azobis(isobutyronitrile), and the like. The reaction is terminated before 50 percent conversion and, preferably, at about 30 to 40 percent conversion, as indicated by the solids content of the reaction mixture. Suitable agents for terminating the reaction include toluhydroquinone, hydroquinone, methyl ether of hydroquinone, and the like.

As will be seen from the following disclosure, the procedure employed in producing the thermoplastic polymers which are incorporated into the polyester resins is one in which a plurality of graft polymers are produced. This plurality of polymers, in combination, and used in their entirety as formed, is referred to herein, collectively, as a "thermoplastic composition".

The thermoplastic composition of the present invention can be produced by employing in the polymerization reaction mixture up to about 5 weight percent of a mono — or polyfunctional organic acid or anhydride which contains one double bond per molecule and which is reactive with the monomer, from about 0.1 to about 7.5 weight percent of a starting unsaturated elastomeric polymer having a molecular weight within the range from about 43,000 to about 380,000, from about 0.1 to about 15 weight percent of a starting unsaturated elastomeric polymer having a molecular weight within the range of from about 500 to about 40,000, up to about 50 weight percent of a comonomer and from 15 to about 99 weight percent of at least one monomer.

A preferred thermoplastic composition of the present invention can be produced by employing in the polymerization reaction mixture up to about 3 weight percent of the organic acid, from about 0.5 to about 5 weight percent of a starting unsaturated elastomeric polymer having a molecular weight within the range from about 60,000 to about 200,000, from about 0.5 to about 9 weight percent of a starting unsaturated elastomeric polymer having a molecular weight within the range of from about 500 to about 40,000, up to about 40 weight percent of a comonomer and from about 35 to about 99 weight percent of at least one monomer.

In the most preferred embodiment of the invention, the thermoplastic composition is produced employing acrylic acid, a styrene-butadiene rubber having a molecular weight of about 100,000, a hydroxy-terminated polybutadiene having a molecular weight of about 1,000, and styrene.

Inasmuch as the preferred monomer is styrene, the invention will be explained in terms thereof without meaning to limit the invention.

The thermoplastic composition can contain up to 50 weight percent of a comonomer which acts to affect pigmentability, coating adhesion, surface gloss and the like, such comonomers including methyl methacrylate, ethyl acrylate, acrylonitrile, vinyl pyridine and the like, and their mixtures.

The first elastomeric unsaturated polymer having a molecular weight within the range of about 43,000 to about 380,000, will be soluble in the monomer employed and will contain not less than 10 percent by weight of a diene. Suitable unsaturated elastomeric polymers include styrene-butadiene rubbers, polybutadienes, polyisoprenes, polychloroprenes, mixtures of the aforesaid polymers and copolymers of the aforesaid polymers with styrene and other monomers.

The second elastomeric unsaturated polymer having a molecular weight within the range of 500 to about 40,000, will be soluble in the monomer employed and will contain not less than 10 percent by weight of a diene. Suitable unsaturated polymers include styrene-butadiene rubbers, polybutadienes, polyisoprenes, polychloroprenes, mixtures of the aforesaid polymers and copolymers of the aforesaid polymers with styrene and other monomers.

As used throughout this specification, the term "molecular weight" refers to weight molecular weight.

The thermoplastic composition can be blended with the polyester thermosetting resin, on a styrene-free basis in a weight ratio from about 1 to 1 to about 1 to 10, respectively. Preferably, the resins will be employed within the range of about 1 part by weight of the thermoplastic composition to about 2 to about 5 parts by weight of the polyester resin. Best results are obtained when employing about 1 part by weight of the thermoplastic composition to about 3 parts by weight of the polyester resin.

In general, the method of this invention is carried out by producing the thermoplastic composition employing the defined elastomers, the polymerization between the monomer, or monomers, and the elastomers being carried out to about 33 percent completion, sufficient monomer being present in the polymerization product such that the unsaturated thermoplastic composition exists in the form of a syrup.

Similarly, the polyester resin is prepared and diluted with monomers such that the unsaturated thermosetting polyester resin exists in the form of a syrup.

These two syrups are blended with a crosslinking agent, a gelling agent and fillers, such as glass fibers, and molded at conditions under which the polyesters crosslink to form a crosslinked polyester matrix in which the thermoplastic, elastomer-based composition exists as a disperse phase.

The following examples demonstrate the effectiveness of the thermoplastic compositions of this invention in decreasing shrinkage and improving surface gloss of the crosslinked, molded polyester resin.

Example I demonstrates the preparation of a typical thermosetting polyester resin syrup with which a control thermoplastic composition and each of the thermoplastic compositions produced employing polymeric elastomers were individually blended and subsequently molded. However, the invention is applicable to any saturated polyester employed in molding compounds and is not to be considered as being limited to the specific embodiment for illustrative purposes.

Example II demonstrates the preparation of the control or comparative thermoplastic resin syrup produced from styrene and acrylic acid in the absence of the employment of the elastomeric polymers used in the method of this invention.

Example III demonstrates the preparation of the thermoplastic composition syrups employing elastomeric polymers in accordance with the invention.

Example IV demonstrates the preparation of the molding compounds from the thermosetting polyester resin syrup of Example I and the thermoplastic composition syrups of Examples II and III and presents comparative data therebetween.

EXAMPLE I

The thermosetting polyester resin syrup was prepared from the following materials substantially in the following manner.

| Materials | Parts by Weight |
| --- | --- |
| Propylene Glycol | 578.2 |
| Maleic Anhydride | 674.4 |
| Toluhydroquinone solution (25% solution in styrene) | 6.8 |

The polyester resin syrup was prepared by charging all of the propylene glycol and one-third of the maleic anhydride into the reactor while using a continuous nitrogen sparge. The temperature of the contents of the reactor was raised to 190° F and about 4 hours after the first distillate, about one-half of the toluhydroquinone solution was added. When the reactor contents reached an acid value of about 35, the remainder of the toluhydroquinone solution was added. Thereafter, the remainder of the maleic anhydride was added at a rate of 10 to 15 parts per minute while controlling the temperature of the mixture at 300° F. Thereafter, the temperature of the mixture was held at 310° F to 320° F for sixty minutes, after which the temperatures was increased to 400° F. The material in the reactor at this point had an acid number of 29 to 32 and 2 parts of the reactor contents diluted with one part of styrene had a viscosity of 21 to 25 at 350° F. (SSU)

The contents of the reactor were cooled to 340° F and diluted with styrene in an amount of 90 parts of reactor contents to 10 parts of styrene to produce a composition stable for 30 minutes at 120° C before gelling.

In another vessel, 486.4 parts by weight of styrene and 0.125 parts by weight of mono-tertiary butyl hydroquinone were mixed and held at a temperature within the range of 130° to 145° F. Thereafter, 1,138 parts of the polyester resin, produced as described above and at a temperature of about 330° F were added to the styrene-hydroquinone mixture to produce a thinned polyester syrup which, at a temperature of 180° F, had a viscosity in the range of 1500 to 2000 cps., a maximum water content of about 0.08 weight percent and a monomer content within the range of about 30 to about 34 percent by weight.

This example demonstrates the preparation of the thermosetting polyester resin syrup with which those thermoplastic compositions prepared in Examples II and III were individually blended and in combination with which molded products were produced.

EXAMPLE II

A control thermoplastic composition syrup, outside of the scope of this invention, was produced by the following method.

83 parts by weight of styrene and 1.04 parts by weight of acrylic acid were charged to a reactor and the reactor contents were heated to 167° F at which temperature 0.123 parts by weight of benzoyl peroxide were added. The reaction was continued at about 167° F for a period sufficient to produce a composite having a solids content of about 33 weight percent. At that point, 0.033 parts by weight of toluhydrouqinone were added and the reaction mixture was cooled. The thermoplastic had an acid number of 8.3 and a viscosity at room temperature of about 4,400 cps.

In this manner, there was produced a saturated thermoplastic resin syrup whose composition lies outside of the invention, which will be to use as a comparison, or "control", in reference to those thermoplastic compositions which lie within the scope of the invention, as prepared in Example III.

EXAMPLE III

A series of elastomers, having the molecular weight previously defined, were incorporated into thermoplastic composition syrups which, in turn, were individually blended with the thermosetting resin syrup produced in Example I. Each mixture of syrups were then compounded into a molding compound according to the procedure outlined in Example IV.

The elastomers which were employed to produce the thermoplastic compositions exemplary of the invention are commercial in origin and are shown in Table I.

Each thermoplastic composition was prepared by producing a polymer with styrene, acrylic acid and two elastomers, each elastomer used having the molecular weight defined. The two elastomers were employed in a total amount of about 7.3 parts by weight per 100 parts by weight of the styrene, acrylic acid and elastomers.

Typical of such preparation is the following in which a styrene-butadiene polymer and a polybutadiene polymer were incorporated into the thermoplastic employing the following materials and procedure:

| Material | Parts by Weight |
|---|---|
| Styrene | 17,700 |
| Solprene 1205C* | 6650 |
| Poly BDR-45-HT | 1410 |
| Acrylic Acid | 312 |
| Benzoyl Peroxide | 37 |
| Toluhydroquinone | 10 |

*7.5 weight % elastomer in styrene

All materials were charged to the reactor except the benzoyl peroxide and the toluhydroquinone. The mixture was sparged with nitrogen at 0.055CFM and heated to 158° F. The benzoyl peroxide was then introduced into the reactor contents and the polymerization was conducted with solids determination being made every 30 minutes. When the solids content had reached 36 ± 2%, indicating the extent of conversion, the toluhydroquinone was added to inhibit further polymerization and the reaction mixture was adjusted to a solids content of about 33% by the addition of styrene to the contents of the reactor to form a thermoplastic composition syrup in accordance with this invention.

EXAMPLE IV

This example demonstrates the preparation of the final molding compounds and sets forth a comparison between those employing the "control" produced in Example II and those of the invention produced in Example III, based upon properties after molding.

In each instance, a quantity of the thermosetting polyester syrup, prepared as in Example I, was individually blended with the thermoplastic composition syrups produced in Example II and in Example III. Each blend had the following composition:

TABLE I

| Elastomer | Elastomer Data | | Polybutadiene Microstructure | | | Molecular Weight | |
|---|---|---|---|---|---|---|---|
| | Manufacturer | Polymer Type | % trans 1,4 | % cis 1,4 | % vinyl 1,2 | No. Average | Weight Average |
| Lithene QH | Lithcoa | Polybutadiene | 30 | 35 | 35 | — | 500 – 1000 |
| Solprene 1205C | Phillips | 25/75 S/B (Block) | — | — | — | 68,000 | 83,000 |
| Solprene 1206 | Phillips | 25/75 S/B (Random) | — | — | — | 122,000 | 212,000 |
| PolyBDR-45-HT | Arco | Polybutadiene | 60 | 20 | 20 | — | 500 – 1000 |

Phillips - Phillips Petroleum Co
Lithcoa - Lithium Company of America
Arco - Arco Chemical Co.
S/B - styrene-butadiene polymer

TABLE II

| Material | Function | Parts by Weight | Weight Percent |
|---|---|---|---|
| Thermosetting Resin Syrup | Thermosetting Resin | 840 | 16.4 |
| Thermoplastic Composition Syrup | Thermoplastic Resin | 560 | 10.9 |
| t-butyl perbenzoate | Crosslinking Catalyst | 14 | 0.3 |
| Zinc stearate | Mold Release Agent | 52 | 1.0 |
| Calcium Carbonate | Filler | 2079 | 40.6 |
| Magnesium Hydroxide | Gelling Agent | 42 | 0.8 |
| Chopped Glass, 1/4" Long Fibers | Filler | 1541 | 30.0 |

The two syrups, the t-butyl perbenzoate, the zinc stearate and calcium carbonate were blended to form a smooth paste. The magnesium hydroxide was added to the paste and mixing was continued for two minutes.

The chopped glass was then added and mixing was continued for an additional 2.5 minutes. Thereafter, the mixture was matured for approximately 48 hours at room temperature.

Each mixture was subsequently molded into a 12 inches × 18 inches flat sheet employing a molding pressure of approximately 1000 psi. at a platen temperature within the range of from 270° to 300° F with a cure cycle of from 2.5 to 3.0 minutes. All sheets were then measured for shrink in relation to the cold mold.

Shrink data for each of the elastomeric-modified thermosetting polyester molding compounds, and the specific formulations employed in each instance, are presented in Table III, below. In each instance a comparison is made, in respect to shrink, with the "control" thermoplastic-modified molding compound.

TABLE III

| Composition of Elastomeric-Thermoplastic Modifier | Parts by Weight | | | | | | |
|---|---|---|---|---|---|---|---|
| Thermoplastic Number | I | II | III | IV | V | VI | Control |
| Styrene | 950 | 925 | 925 | 925 | 925 | 925 | 1000 |
| Acrylic Acid | 12.5 | 12.5 | 12.5 | 10.5 | 12.5 | 12.5 | 12.5 |
| Solprene 1206 | 25 | 75 | — | — | — | — | — |
| Lithene QH | 25 | 75 | — | — | — | — | — |
| Solprene 1205-C | — | — | — | — | — | — | — |
| R-45-HT | — | — | 55 | 55 | 55 | 55 | — |
| Benzoyl Peroxide | — | 1.5 | 1.5 | 1.5 | 1.5 | — | — |
| Toluhydroquinone | 0.4 | 0.4 | 0.4 | 0.4 | 0.4 | 0.4 | — |
| Syrup Viscosity, cps at 68° F | 3100 | 8400 | 5610 | 9090 | 6180 | 8420 | 4300 |
| Wgt. % Elastomers in Thermoplastic | 5.0 | 15.0 | 7.5 | 7.5 | 7.5 | 7.5 | 0 |
| Property of Molding Compound Incorporating Thermoplastic | | | | | | | |
| Shrink, * | 0.31 | 0.41 | 0.09 | 0.16 | 0.24 | 0.21 | .55 |
| Shrink vs control ** | 56 | 32 | 81 | 70 | 57 | 62 | 100 |
| Gloss | | | | | | | |

*Shrink expressed in mils/inch.
**Percent reduction in shrink relative to control.

It will be seen from the above that the incorporation of elastomeric-based thermoplastic compositions in thermosetting resins produces molding compounds which undergo reduced shrinkage upon molding in comparison with the control which contained no elastomers. It will also be noted that combinations of styrene-butadiene copolymers and polybutadiene having molecular weights of approximately 83,000 and 500 – 1000, respectively, are particularly suitable for use in the invention, particularly when benzoyl peroxide is employed as the polymerization initiator and the polymerization producing the graft copolymer incorporating the elastomers is conducted to an extent within the range of about 33 to about 37 percent.

It will be evident from the foregoing that various modifications can be made to this invention. Such, however, are considered as being withint the scope of the invention.

What is claimed is:

1. A moldable composition comprising:
   a. an unsaturated, crosslinkable thermosetting resin;
   b. an ethylenically unsaturated first monomer;
   c. a thermoplastic resin soluble in said first monomer, said thermoplastic resin comprising the reaction product of a second monomer with a mixture comprising first and second unsaturated elastomeric copolymers, said first unsaturated elastomeric polymer having a weight average molecular weight within the range of from about 43,000 to about 38,000, said second unsaturated elastomeric polymer having a weight average molecular weight within the range of from about 500 to about 40,000, said thermoplastic resin being present in said moldable composition in an amount sufficient to improve at least one property of said thermosetting resin upon molding.

2. The composition of claim 1 in which said unsaturated crosslinkable thermosetting resin is an unsaturated polyester and said ethylenically unsaturated first monomer is copolymerizable with said unsaturated polyester.

3. The composition of matter of claim 1 wherein said thermoplastic resin is produced from about 0.1 to about 7.5 weight percent of said first unsaturated elastomeric polymer and from about 0.1 to about 15 weight percent of said second unsaturated elastomeric polymer.

4. The composition of claim 1 wherein said thermoplastic resin is produced of from about 0.5 to about 5 weight percent of an unsaturated elastomeric polymer having a weight average molecular weight within the range of from about 60,000 to about 200,000 and from about 0.5 to about 9 weight percent of an unsaturated elastomeric polymer having a weight average molecular weight within the range of from about 500 to about 40,000.

5. The composition of claim 1 wherein said first unsaturated elastomeric polymer is a styrene-butadiene rubber having a weight average molecular weight of about 100,000 and said second elastomeric polymer is a weight hydroxy-terminated polybutadiene having a molecular weight of about 1,000.

6. The composition of claim 1 in which said thermoplastic resin is blended with said thermosetting resin on a monomer-free basis in a weight ratio of from about 1 to 1 to about 1 to 10.

7. The composition of claim 1 in which said thermoplastic resin is blended with said thermosetting resin on a monomer-free basis in a weight ratio of from about 1 to 2 to about 1 to 5.

8. The composition of claim 1 in which said thermoplastic resin is blended with said thermosetting resin on a monomer-free basis in a weight ratio of from about 1 to about 3.

9. The composition of claim 1 where said first unsaturated elastomeric polymer is a styrene-butadiene copolymer having a weight average molecular weight of about 83,000 and said second unsaturated elastomeric polymer is a polybutadiene having a weight average molecular weight of about 500 to 1000.

10. The composition of claim 1 in which said first unsaturated elastomeric polymer is employed in an amount within the range from about 0.1 to about 7.5 weight percent of a polymerizable mixture comprising the monomer and said first and said second unsaturated elastomers.

11. The composition of claim 1 in which said second unsaturated elastomeric polymer is employed in an amount within the range from about 0.1 to about 15 weight percent of a polymerizable mixture comprising the monomer and said first and said second unsaturated elastomers.

12. The composition of claim 1 in which said thermoplastic resin is produced in a polymerization mixture containing up to about 3 weight percent of a monofunctional or polyfunctional organic acid or organic acid anhydride containing one reactive double bond per molecule.

13. The composition of claim 1 in which said thermoplastic resin is produced employing up to 40 weight percent of a comonomer selected from the group consisting of methyl methacrylate, ethyl acrylate, acrylonitrile and vinyl pyridine.

14. The composition of claim 1 in which said first and second unsaturated elastomeric polymers each contain not less than 10 weight percent of a diene and said composition is produced employing up to about 3 weight percent acrylic acid, about 7.5 weight percent of said first unsaturated elastomeric polymer, about 15 weight percent of said second unsaturated elastomer and about 72 to about 73 weight percent of a monomer.

15. The composition of claim 1 in which said thermosetting resin and said thermoplastic resin are combined in contact with a crosslinking agent and a gelling agent.

16. The composition of claim 1 containing glass fibers.

17. The composition of claim 1 in which said moldable composition comprises about 16 weight percent of said thermosetting resin as a syrup containing about 33 percent solids, about 11 weight percent of said thermoplastic resin as a syrup containing about 33 percent solids and about 30 weight percent glass.

18. The composition of claim 2 in which said first monomer and said second monomer comprise styrene.

19. A method of producing a molded composition which comprises:
    a. forming a mixture comprising an unsaturated, crosslinkable thermosetting resin, an ethylenically unsaturated first monomer and a thermoplastic resin soluble in said first monomer, said thermoplastic resin comprising the reaction product of a second monomer with a mixture comprising first and second unsaturated elastomeric polymers, said first unsaturated elastomeric polymer having a weight average molecular weight within the range of from about 43,000 to about 380,000, said second unsaturated elastomeric polymer having a weight average molecular weight within the range of from about 500 to about 40,000, said thermoplastic resin being present in said mixture in an amount sufficient to improve at least one property of said thermosetting resin upon molding; and,
    b. molding said mixture.

20. The method of claim 19 in which mixture is molded in contact with a gelling agent.

21. The method of claim 19 in which said first and said second unsaturated elastomeric polymers are selected from the group consisting of polybutadienes, styrene-butadiene block polymers and styrene-butadiene random copolymers.

22. The method of claim 21 in which said polybutadiene has a 1,4-trans content of about 30 percent, a 1,4-bis content of about 35 percent and a 1,2-vinyl content of about 35 percent.

23. The method of claim 21 in which said polybutadiene has a 1,4-trans content of about 60 percent, a 1,4-cis content of about 20 percent and a 1,2-vinyl content of about 20 percent.

24. The method of claim 21 in which said thermosetting resin is a polyester, said first monomer is styrene and said second monomer is styrene and said mixture is molded in contact with a gelling agent.

25. The method of claim 24 in which said polyester is produced employing a monofunctional or polyfunctional organic acid or anhydride which is reactive with said first monomer, a first unsaturated elastomeric polymer having a weight average molecular weight within the range of from about 60,000 to about 200,000 and a second elastomeric polymer having a weight average molecular weight within the range of from about 500 to about 40,000.

26. The method of claim 24 in which said organic acid is acrylic acid, said first unsaturated elastomeric polymer is a styrene-butadiene rubber having a weight average molecular weight of about 100,000 and said second elastomeric polymer is a hydroxy-terminated polybutadiene having a weight average molecular weight of about 1,000.

27. A molded composition comprising:
    a. a continuous phase comprising a thermosetting resin; and,
    b. a disperse phase within said continuous phase, said disperse phase being derived from a thermoplastic resin comprising the reaction product of a monomer with a mixture comprising first and second unsaturated elastomeric polymers, first unsaturated elastomeric polymer having a weight average molecular weight within the range of from about 43,000 to about 380,000, said second unsaturated elastomeric polymer having a weight average molecular weight within the range of from about 500 to about 40,000, said thermoplastic resin being present in said thermosetting resin in an amount sufficient to improve at least one property of said thermosetting resin upon molding.

28. A method of improving the properties of a thermosetting composition upon molding which comprises:
    a. incorporating into a continuous phase thermosetting composition a disperse phase comprising a thermoplastic resin comprising the reaction product of a monomer with a mixture comprising first and second unsaturated elastomeric polymers, said first unsaturated elastomeric polymer having a weight average molecular weight within the range of from about 43,000 to about 380,000, said second unsaturated elastomeric polymer having a weight average molecular weight within the range of from about 500 to about 40,000, said thermoplastic resin being present in said thermosetting resin in an amount sufficient to improve at least one property of said thermosetting resin upon molding.

* * * * *